United States Patent [19]

Shaw et al.

[11] 4,410,275
[45] Oct. 18, 1983

[54] FIBER OPTIC ROTATION SENSOR

[75] Inventors: Herbert J. Shaw, Stanford; Herve C. Lefevre, Los Altos; Ralph A. Bergh, Palo Alto, all of Calif.

[73] Assignee: The Board of Trustees of the Leland Stanford Junior University, Stanford, Calif.

[21] Appl. No.: 249,714

[22] Filed: Mar. 31, 1981

[51] Int. Cl.$^3$ .......................... G01B 9/02; G01C 19/64
[52] U.S. Cl. ...................................................... 356/350
[58] Field of Search ......................................... 356/350

[56] References Cited

U.S. PATENT DOCUMENTS

| | | | |
|---|---|---|---|
| 4,248,535 | 2/1981 | Pircher | 356/350 |
| 4,283,144 | 8/1981 | McLandrich | 356/350 |
| 4,302,107 | 11/1981 | Schiffner et al. | 356/350 |

OTHER PUBLICATIONS

"Single-Mode Fiber-Optic Polarizer" Bergh et al., Optics Letters, vol. 5, No. 11, Nov. 1980, pp. 479-481.
"Single-Mode Fiber Optic Directional Coupler", Bergh et al., Electronics Letters, Mar. 27, 1980, vol. 16, No. 7, pp. 260-261.
"Single-Mode Fiber Fractional Wave Devices and Polarization Controllers" Lefevre, Electronics Letters, Sep. 25, 1980, vol. 16, #20, pp. 778-780.
"Fiber-Optic Rotation Sensing with Low Drift", Ulrich, May 1980, vol. 5, No. 5, Optics Letters, pp. 173-175.

*Primary Examiner*—Vincent P. McGraw
*Attorney, Agent, or Firm*—Knobbe, Martens, Olson & Bear

[57] ABSTRACT

Rotation sensor having a loop of fiber optic material in which counter propagating waves are generated with a phase relationship corresponding to the rate at which the loop is rotated. All fiber optic components are employed in the system for directing the light to and from the loop and establishing, maintaining and controlling proper polarization of the light. In one particularly preferred embodiment, the loop and other components are formed on a single strand of fiber optic material which extends continuously through the system.

6 Claims, 4 Drawing Figures

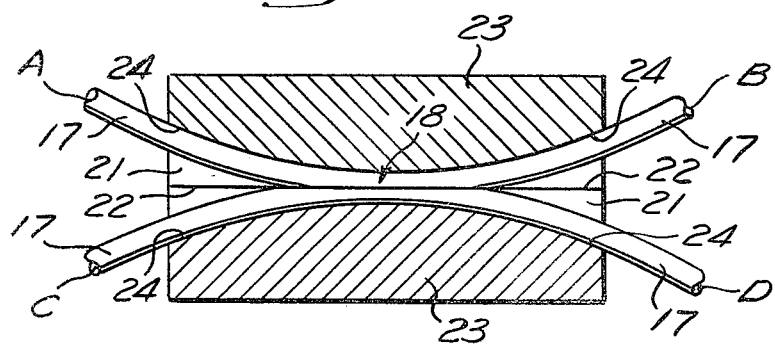
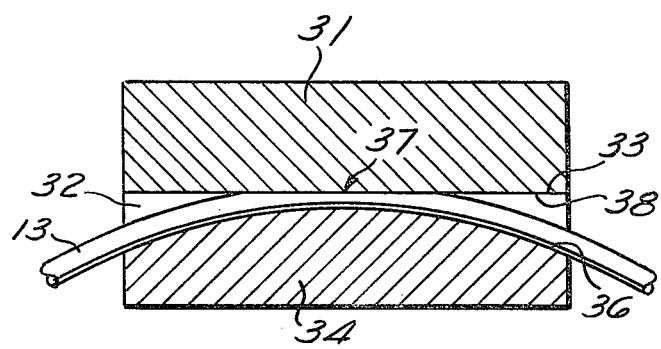
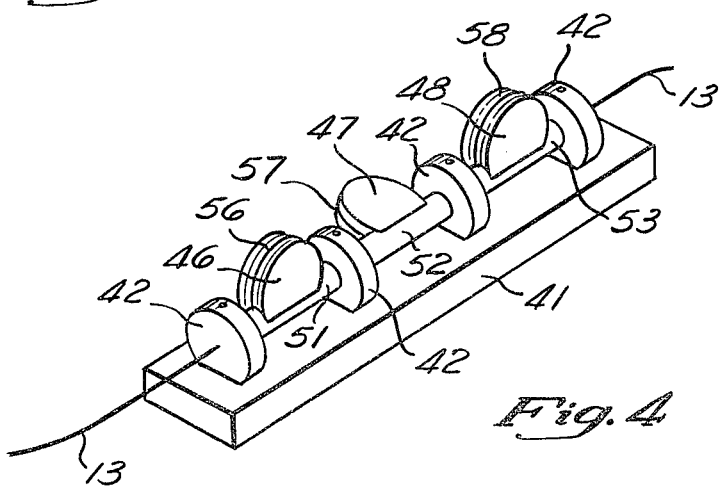

FIBER OPTIC ROTATION SENSOR

This invention pertains generally to gyroscopes, interferometers and other instruments for sensing rotation, and more particularly to a rotation sensor of the type employing a sensing loop of fiber optic material.

In Sagnac gyroscopes and other fiber optic rotation sensors counter propagating waves are generated in a loop of fiber optic material with a phase relationship corresponding to the rate at which the loop is rotated. Systems of this nature heretofor provided have employed bulk optical components for processing and directing the light applied to the sensing loop. While these devices provide a substantial improvement over other types of rotation sensors, they are subject to certain limitations and other disadvantages. For example, the various components must be aligned with each other within very close tolerances for the systems to perform properly, and this critical alignment can be difficult to establish and maintain in a practical system which is subjected to mechanical vibration, thermal change and other physical disturbances.

It is in general an object of the invention to provide a new and improved fiber optic rotation sensor which overcomes the foregoing and other disadvantages of systems employing bulk optical components.

Another object of the invention is to provide a rotation sensor of the above character which utilizes fiber optic components for guiding and processing the light applied to the sensing loop.

Another object of the invention is to provide a rotation sensor of the above character in which the sensing loop and the components for guiding and processing the light are formed along a continuous, uninterrupted strand of fiber optic material.

These and other objects are achieved in accordance with the invention by providing a rotation sensor having a light source, a loop of fiber optic material, an output detector, and all fiber optic components interconnecting the source, loop and detector. Fiber optic directional couplers split the light from the source into two waves which propagate around the loop in opposite directions, combine the counter propagating waves for transmission along a single fiber, and apply the counter propagating waves to the output detector. Proper polarization of the applied light and the counter propagating waves is established, controlled and maintained by a fiber optic polarizer and fiber optic polarization controllers, ad the applied light and counter propagating waves are modulated in phase to eliminate the effects of backscatter and other noise in the system. In one particularly preferred embodiment, the loop, couplers, polarizer, polarization controllers and phase modulators are all formed along an uninterrupted strand of fiber optic material which extends continuously throughout the system.

FIG. 2 is a sectional view of one embodiment of a bidirectional fiber optic coupler for use in the rotation sensor of FIG. 1.

FIG. 3 is a sectional view of one embodiment of a fiber optic polarizer for use in the rotation sensor of FIG. 1.

FIG. 4 is an isometric view of one embodiment of a fiber optic polarization controller for use in the rotation sensor of FIG. 1.

Figure 1:
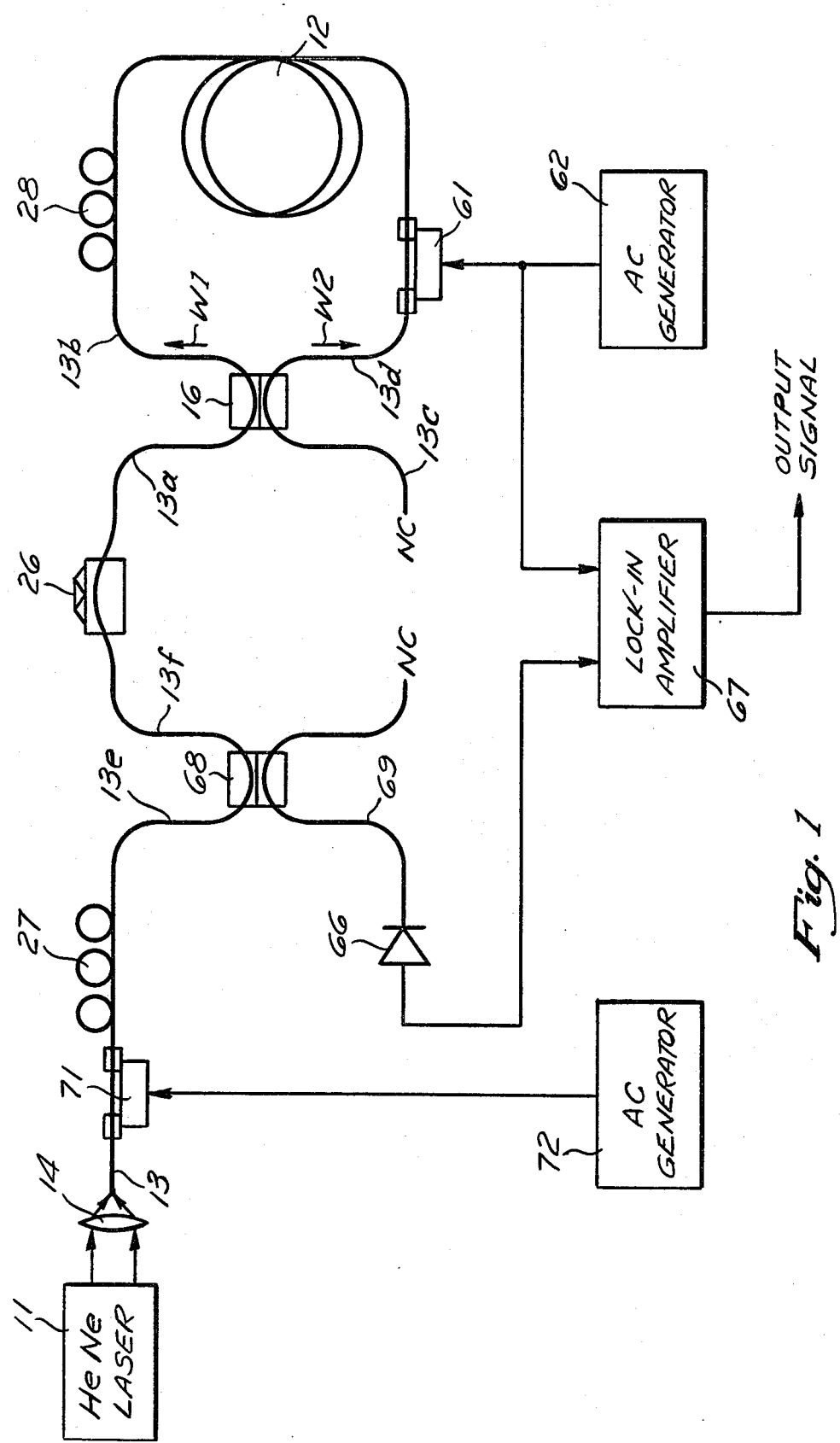
FIG. 1 is a schematic diagram of one embodiment of a rotational sensor incorporating the invention.

As illustrated in FIG. 1, the rotation sensor includes a light source 11 and a loop 12 of fiber optic material. In one presently preferred embodiment, the light source comprises a helium-neon laser which produces light having a wavelength on the order of 1.15 microns. The fiber optic material is preferably a single mode fiber having, for example, an outer diameter of 125 microns and a core diameter of 9 microns. The loop comprises a plurality of turns wrapped about a spool or other suitable support (not shown), and in one presently preferred embodiment, the loop has approximately 1800 turns of fiber wound on a form having a diameter of 16 cm.

The loop is preferably wound with the central turns on the inside and the outer turns on the outside so that the winding is symmetrical and disturbances due to environmental changes (e.g., temperature or vibration) are effectively cancelled. In addition, the fiber is freely accessible at both ends of the loop, rather than having one end portion brought out from the inside of the loop. The winding is done by forming the fiber into two supply rolls, each comprising approximately one half of the fiber. Then, starting at the center, the fiber is wound from the two rolls onto the spool in opposite directions to form the loop. As the winding builds up on the spool, the two ends are always on the outside.

Light from source 11 is coupled to one end of a fiber 13 by a lens 14. Fiber 13 is a single mode fiber similar to the fiber from which loop 12 is formed, and in the embodiment illustrated it is an extension of the fiber which forms the loop.

The portions of the fiber near the ends of the loop are brought together to form a bidirectional fiber optic coupler. This coupler serves to split the light from source 11 into two waves W1 and W2 which propagate around the loop in opposite directions. The coupler also serves to combine the two counter propagating waves from the loop for transmission back along fiber portion 13a toward the light source. After passing through coupler 16, end portion 13c terminates nonreflectively.

A preferred fiber optic directional coupler for use in the rotation sensor of the invention is illustrated in FIG. 2. This coupler and a method of manufacturing the coupler are described in detail in copending application Ser. No. 139,551, filed Apr. 11, 1980. The coupler comprises two strands 17 of single mode fiber optic material having the cladding removed from one side thereof. The two strands are brought together with the portions of the strands where the cladding has been removed in close facing relationship to form a region 18 of interaction in which light is transferred between the core portions of the strands. The amount of material removed is such that the core portion of each strand is within the evanescent field of the other, and the center-to-center spacing between the strands at the center of the coupler is typically less than about 2–3 core diameters.

Strands 17 are mounted in slots 21 which open through flat, confronting faces 22 of generally rectangular fused quartz blocks 23. Slots 21 have arcuately curved bottom walls 24, and the fiber optic strands are affixed to the blocks so that they follow the contour of these walls. Thus, the strands converge toward the center of the blocks and diverge toward the edges of the blocks.

The coupler has four ports labelled A–D in FIG. 2, with ports A, B at opposite ends of one of the strands and ports C, D at opposite ends of the other strand. In coupler 16, the light from source 11 is applied to port A, and this light is split approximately equally between ports B and D so that counter propagating waves W1 and W2 are approximately equal in magnitude. The two counter propagating waves applied to ports B and D contribute equally to the interference or output wave at port A.

The output wave emerging from port A of coupler 16 is sensitive to the difference between the phases of the two counter propagating waves from which it is formed in that the amplitude of the output wave corresponds to the phase difference between the counter propagating waves. To eliminate phase shifts other than those due to rotation of the loop, it is important to detect only those portions of the waves which travel the same optical path. This insures that slow changes in the optical path due to environmental conditions (e.g. temperature) will affect the phases of both waves equally. For light which exits from coupler 16 through the same port through which it enters, the geometric path of both counter propagating waves is the same. In addition, the "polarization path" can be made the same by utilizing a single state of polarization for the input and output waves.

Means is provided for establishing, maintaining and controlling a desired state of polarization for both the applied light and the counter propagating waves. This means includes a fiber optic polarizer 26 and fiber optic polarization controllers 27, 28 connected between light source 11 and loop 12. Polarizer 26 is connected between the light source and port A of coupler 16, and polarization controller 27 is connected between the light source and the polarizer to control the polarization of the applied light or input wave. Polarization controller 28 is connected between port B of coupler 16 and one end of the loop to control the polarization of the counter propagating waves and, hence, the output wave. By means of controller 27, the state of polarization of the applied light is adjusted for efficient passage by polarizer 26, and controller 28 is adjusted for efficient passage of the waves returning from the fiber loop. Even though controller 28 is located on one side of the loop, it controls the state of polarization of both of the counter propagating waves.

A preferred polarizer for use in the rotation sensor of FIG. 1 is illustrated in FIG. 3. This polarizer and a method of manufacturing the same are described in detal in copending application Ser. No. 195,934, filed Oct. 10, 1980. This polarizer includes a birefringent crystal 31 positioned within the evanescent field of light transmitted by fiber 13, the crystal providing different wave velocities for light of different polarizations. The relative indices of refraction of the fiber and the birefringent material are selected to be such that the wave velocity of light of the desired polarization mode is greater in the birefringent material than in the fiber and the wave velocity of an undesired polarization mode is greater in the fiber than in the birefringement material. Light of the desired polarization mode remains guided by the core portion of the fiber, whereas light of the undesired polarization mode is coupled from the fiber to the birefringent material. The crystal is brought within the evanescent field of the fiber by removing the cladding from one side of the fiber and positioning the crystal close to the core in this region.

As illustrated in FIG. 3, fiber 13 is mounted in a slot 32 which opens through the upper face 33 of a generally rectangular quartz 34. The slot has an arcuately curved bottom wall 36, and the fiber is affixed to the block so that it follows the contour of the bottom wall. In manufacture, the fiber strand is mounted in the slot, and the upper surface of the block and the fiber are ground simultaneously to remove the cladding in region 37. Thereafter, crystal 31 is mounted on the block, with the lower surface 38 of the crystal facing the upper surface 33 of the block.

Polarization controllers 27, 28 are identical, and a preferred polarization controller for use in the rotation sensor of FIG. 1 is illustrated in FIG. 4. This polarization controller is described in detail in copending application Ser. No. 183,975, filed Sept. 4, 1980, and includes a base 41 on which a plurality of upright blocks 42 are mounted. Between adjacent ones of the blocks, spools 46–48 are mounted on shafts 51–53 which are axially aligned and rotatively mounted in the blocks. The spools are generally cylindrical, and they are positioned tangentially of the shafts, with the axes of the spools perpendicular to the axis of the shafts.

Strand 13 extends through axial bores in shafts 51–53 and is wrapped about spools 46–48 to form three coils 56–58. The radii of the coils is relatively tight (e.g. 0.85 cm.), and consequently the fiber is stressed to form a birefringent medium in each of the coils. The three coils can be rotated independently about the axis of the shafts to adjust the polarization of light passing through the strand. In the embodiment illustrated, the three coils provide spatial delays of $\lambda/4$, $\lambda/2$ and $\lambda/4$, respectively. However, any suitable number of coils and delays can be employed, for example, two coils each providing a delay of $\lambda/4$.

Means is provided for modulating the phases of the counter propagating waves to bias the output signal and thereby improve the sensitivity of the system and provide an indication of the direction of rotation. This biasing is desirable because the portions of the counter propagating waves from the loop which are passed by the polarizer add in phase to a maximum value when the sensing loop is at rest. At this maximum, the output signal has low sensitivity to small phase differences between the interferring waves, and it does not indicate the direction of rotation. Shifting the relative phases of the interfering waves to provide a phase shift of $\pi/2$ or an odd multiple thereof when the loop is at rest maximizes the sensitivity and provides an indication of directionality from the rest condition.

The means for modulating the counter propagating waves comprises a phase modulator 61 connected between coupler 16 and one end of loop 12. This modulator comprises a piezoelectric transducer which modulates the length and/or the refractive index of the fiber in a known manner. A modulating signal is applied to the modulator by an AC generator operating at a suitable voltage level and frequency, e.g. a voltage of 12 volts RMS and a frequency of 26 KHz.

The amplitude of the phase modulation is identical for the two counter propagating waves, but a relative phase difference $\Delta\Phi(\tau)$ is produced between the two waves due to the propagation time through the fiber loop. This phase difference varies symmetrically about the classical Sagnac phase shift $\Delta\Phi_r = 4\pi LR\Omega/\lambda c$ produced by rotation, where $\Omega$ is the rotation rate, and L is the length of the fiber, R is the radius of the coil, and $\lambda$ and c are the wavelength and the speed of the light in a vacuum respectively. The Fourier expansion of the output signal resulting from square law detection of the interference of the two phase modulated counter propagating waves shows that the even and odd harmonics of the modulation frequency are proportional to cos $\Delta\Omega_r$ and sin $\Delta\Phi_r$, respectively. The latter provide a biased signal which on a high frequency carrier avoids low frequency electronic noise. The bias so defined is independent of the stability of the amplitude of the modulation, the laser power and the fiber birefringence.

An output detector responsive to the difference in phase between the two counter propagating waves provides an output signal corresponding to the rate of rotation of sensing loop 12. This detector comprises a photodiode 66 and a lock-in amplifier 67. The output wave passing through polarizer 26 varies in amplitude in accordance with the phase difference of the counter propagating waves, and this wave is coupled to the photodiode by a second fiber optic bidirectional coupler 68 which is similar to coupler 16. However, rather than utilizing two portions of strand 13, coupler 68 employs a separate output strand 69 to which the output wave passing through polarizer 26 is applied. One end of this strand is coupled to the photodiode, and the other end is terminated nonreflectively. As illustrated, controller 27 is connected to port A of coupler 68, polarizer 26 is connected to port B, photodiode 66 is connected to port C, and there is no connection to port D. Photodiode 66 responds to the amplitude of the output wave from coupler 16 to provide an electrical signal corresponding to the difference in phase between the counter propagating waves. This signal is applied to the input of lock-in amplifier 67, and a reference signal is applied to the lock-in amplifier from AC generator 62. The lock-in amplifier functions as a synchronous detector to provide an output signal corresponding to the rate of rotation of the sensing loop.

A second phase modulator 71 is provided between light source 11 and polarization controller 27 to modulate the relative phases of the applied light and noise in the system and thereby average the parasitic interference and reduce the environmental sensitivity of the system. A difference in phase results from this modulation since the noise and the desired signal have different propagation times in the system. Modulator 71 is similar to modulator 61, and a modulating signal is applied to modulator 71 by an AC generator 72. Alternatively, phase modulator 71 can be located at the midpoint or center of loop 12 rather than at the input of the system, and in some applications this position is preferred because it affects more noise components than a modulator located toward one end of the system.

In the embodiment illustrated, a single strand of fiber optic material extends continuously through the system, and all of the fiber optic components (loop 12, couplers 16, 68, polarizer 26, polarization controllers 27, 28 and phase modulators 61, 71) are formed directly on this strand. Alternatively, the fiber optic components can be formed separately and spliced together, e.g. by bonding with an ultra violet setting adhesive. However, the use of an uninterrupted strand throughout the system is preferred because it eliminates transmission loss in the splices and noise due to reflections from the splices.

In one presently preferred embodiment, loop 12 is formed on a spool having a diameter of 16 centimeters and a width of about 10 centimeters, and the fiber optic components are mounted in a cavity in the body of the spool. This provides a compact instrument which is rugged in construction and capable of performance equal to or better than rotation sensors utilizing bulk optical components.

Operation and use of the rotation sensor can be described briefly as follows. Loop 12 is positioned coaxially of the axis about which rotation is to be sensed. Light from source 11 passes through modulator 71, polarization controller 27, coupler 68 and polarizer 26 to coupler 16 where it is split into counter propagating waves W1, W2. These waves pass through polarization controller 28 and phase modulator 61, propagate around the loop, and return to coupler 16 with a difference in phase corresponding to the rate of rotation of the loop. Interference of the counter propagating waves in coupler 16 results in an output wave which varies in amplitude in accordance with the difference in phase between the counter propagating waves. This output wave is directed to polarizer 26, from which it passes through coupler 68 to photodiode 66. The photodiode provides an electrical signal corresponding to the difference in phase, and this signal is applied to lock-in amplifier 67 to provide an output signal corresponding to the rate of rotation of the loop. Polarization controller 28 and polarizer 26 assure that the detected portions of the counter propagating waves will have a single state of polarization, and polarization controller 27 adjusts the polarization state of the input light for maximum transmission by the polarizer. Modulator 61 enhances the sensitivity of the system by modulating the phases of the counter propagating waves to bias the system away from the relatively unsensitive condition which would otherwise exist when the system is at rest, and modulator 71 tends to average parasitic interference and reduce the environmental sensitivity of the system.

It is apparent from the foregoing that a new and improved fiber optic rotation sensor has been provided. While only certain presently preferred embodiments have been described in detail, as will be apparent to those familiar with the art, certain changes and modifications can be made without departing from the scope of the invention as defined by the following claims.

We claim:

1. An all-fiber optic rotation sensor, comprising:

a light source for producing a light wave;

a single, continuous, uninterrupted strand of optical fiber forming a line portion and a loop portion, said light source optically coupled to said line portion for propagation of said light wave through said line portion to said loop portion;

said single, continuous strand of optical fiber having a portion of the cladding removed from one side of said fiber at the ends of said loop portion to form first and second oval surfaces, said first and second oval surfaces juxtaposed and optically closing said loop portion to couple said loop portion and said line portion;

a portion of said single, continuous, uninterrupted strand of fiber in said loop portion forming a coil, the diameter of said coil selected to stress said fiber to provide a birefringent medium for controlling the polarization of light propagating in said loop portion;

a portion of said single, continuous, uninterrupted strand of optical fiber having a portion of the cladding removed from one side thereof to form a third oval surface;

a birefringent crystal juxtaposed with said third oval surface and forming a polarizer to cause light propagating through said strand to be polarized to a preselected polarization; and means for coupling light from said line portion to provide an output signal indicative of the rotation rate of said loop portion, said polarizer passing only the portion of said light coupled to said line portion from said loop portion which travels an identical optical path length through said loop to said coupling means so that nonrotationally induced phase differences in said output signal are eliminated.

2. An all-fiber optic rotation sensor, as defined by claim 1, additionally comprising a phase modulator for modulating the phase of light propagating through said fiber relative to noise.

3. An all-fiber optic rotation sensor, as defined by claim 2, wherein said phase modulator is located in said line portion of said single, continuous strand of fiber.

4. An all-fiber optic rotation sensor, as defined by claim 2, wherein said phase modulator is located at the center of said loop portion.

5. A method of sensing rotation, comprising:
providing a single, continuous, uninterrupted strand of single mode optical fiber;
removing a portion of the cladding from said fiber in at least three locations along said continuous fiber strand to provide at least three coupling regions where the periphery of the core of said fiber is within three core diameters of the periphery of the cladding of said fiber;
juxtaposing two of said coupling regions to form a closed loop in said continuous fiber strand;
juxtaposing a birefringent crystal with a third of said coupling regions to form a polarizer;
coupling a lightwave to said continuous fiber strand for propagation to said loop to form a pair of waves which counterpropagate about said loop;
forming a coil in said continuous fiber strand, which has a diameter sufficiently small to create stress induced birefringence to control the polarization of said counterpropagating waves; and
detecting only those portions of said counterpropagating waves which travel identical optical path lengths about said loop to provide an output signal indicative of rotation of said loop.

6. An all-fiber optic rotation sensor, comprising:
a light source for producing a light wave;
a detector, for detecting said light wave;
a splice-free fiber optic waveguide which forms continuous, uninterrupted, guided optical path, comprised entirely of fiber optic material having a core surrounded by a cladding, for guiding light between said source and said detector, said fiber optic waveguide including a line portion and a loop portion, said light source optically coupled to said line portion for propagation of said light wave through said line portion to said loop portion;
said fiber optic waveguide having a portion of the cladding removed from one side thereof at the ends of said loop portion to form first and second oval surfaces, said first and second oval surfaces juxtaposed and optically closing said loop portion to couple said loop portion and said line portion, so that said light wave is split into two counterpropagating waves which traverse said loop portion;
a portion of said fiber optic waveguide in said loop portion forming a coil, the diameter of said coil selected to stress said fiber optic material to provide a birefringent medium for controlling the polarization of said counterpropagating waves in said loop portion;
a portion of said fiber optic waveguide having a portion of the cladding removed from one side thereof to form a third oval surface;
a birefringent crystal juxtaposed with said third oval surface and forming a polarizer to cause light propagating through said waveguide to be polarized to a preselected polarization; and
means for coupling light from said waveguide to provide an output signal indicative of the rotation rate of said loop portion, said polarizer passing only the portion of said counterpropagating light waves, which travel an identical optical path length through said loop portion, to said coupling means so that nonrotationally induced phase differences in said output signal are eliminated.

* * * * *